United States Patent [19]

Heiberger

[11] 4,251,406
[45] Feb. 17, 1981

[54] WATER-BORNE ALKYDS

[75] Inventor: Philip Heiberger, Broomall, Pa.

[73] Assignee: E. I. Du Pont de Nemours and Company, Wilmington, Del.

[21] Appl. No.: 970,235

[22] Filed: Dec. 18, 1978

[51] Int. Cl.³ .............................................. C09D 3/64
[52] U.S. Cl. ................... 260/22 R; 260/22 M; 260/29.2 E; 528/294; 528/295
[58] Field of Search ............ 260/22 M, 22 R, 29.2 E; 528/294, 295

[56] References Cited

U.S. PATENT DOCUMENTS

| | | | |
|---|---|---|---|
| 1,098,728 | 6/1914 | Howell | 260/22 R |
| 1,141,944 | 6/1915 | Dawson | 260/22 R |
| 3,563,942 | 2/1971 | Heiberger | 260/29.2 E |
| 3,663,498 | 5/1972 | Uebe et al. | 528/295 |
| 3,853,820 | 12/1974 | Vachon | 528/295 |
| 3,910,846 | 10/1975 | Azar et al. | 260/29.2 E |
| 4,045,392 | 8/1977 | Callahan et al. | 260/22 R |
| 4,052,368 | 10/1977 | Larson | 260/29.2 E |
| 4,104,262 | 8/1978 | Schade | 528/295 |
| 4,119,680 | 10/1978 | Vachon | 528/295 |
| 4,156,073 | 5/1979 | Login | 528/295 |
| 4,167,395 | 9/1979 | Engelhardt et al. | 528/294 |

FOREIGN PATENT DOCUMENTS 2438379 2/1976 Fed. Rep. of Germany ........... 528/295

*Primary Examiner*—Ronald W. Griffin

[57] ABSTRACT

Water-borne alkyds containing polybasic acids, a sulfonated aromatic acid, or equivalent, e.g., the sodium salt of 5-sulfoisophthalic acid, polyhydric alcohols, and fatty acids, are prepared in a two-step process by first reacting the carboxylic acids and the alcohols until a clear solution is obtained and then adding and reacting the fatty acid to achieve a desired relatively low acid number. These alkyd products are water dispersible without the need for amine stabilization and form protective films on substrates.

11 Claims, No Drawings

WATER-BORNE ALKYDS

BACKGROUND OF THE INVENTION

1. Field of the Invention

This invention relates to novel watercompatible film-forming alkyd resins containing sulfonic acid salts of aromatic carboxylic acids and to a process for preparing them.

2. Prior Art

My U.S. Pat No. 3,563,942 shows sulfonated aromatic carboxylic acids and their equivalents, useful in the present invention, in linear copolyesters and is incorporated in its entirety by reference herein.

Callahan et al. U.S. Pat. No. 4,045,392 shows improvements in the preparation of alkyd resins.

DESCRIPTION OF THE INVENTION

Water-soluble alkyd resins are usually high acid number resins solubilized with volatile amines [cf. D. H. Solomon, The Chemistry of Organic Film Formers, p. 311, Krieger Publishing Co., Huntington, N.Y. (1977)]. These additives are volatile and allegedly precursors to nitrosamines [Science 191, 268 (Jan. 23, 1976)]. The object of this invention is to produce water-borne alkyd resins which need neither ammonia nor amine to control pH or stability or for other reasons.

In accordance with this invention, water-borne alkyds are produced which can be employed or stored without the necessity for ammonia or amines. This objective is accomplished by the use, in an otherwise conventional or substantially conventional alkyd formulation, of a sodium or potassium salt of an aromatic carboxylic acid (or equivalent) which provides water solubility. This aromatic acid may be regarded as a substitute for some of the acid conventionally employed.

Alkyd resins are nonlinear polymers prepared by an esterification reaction of a polybasic organic acid with a polyhydric alcohol and, in this invention, also with drying oils or drying oil fatty acids. They can be modified with dibasic, tribasic or tetrabasic organic acids or anhydrides or monobasic organic acids.

Typical polyhydric alcohols that can be used to prepare alkyd resins are as follows: ethylene glycol, propylene glycol, 1,3-butylene glycol, pentanediol, neopentyl glycol, hexylene glycol, diethylene glycol, dipropylene glycol, triethylene glycol, glycerine (99%), glycerine (95%), trimethylolethane, trimethylolpropane, pentaerythritol, methylglucoside, dipentaerythritol, and sorbitol.

Typical dibasic organic acids and anhydrides that can be used to prepare alkyd resins are as follows: adipic acid, azelaic acid, chlorendic acid, chlorendic anhydride, fumaric acid, isophthalic acid, phthalic anhydride, terephthalic acid, maleic anhydride, succinic acid, succinic anhydride, sebacic acid, and diglycolic acid.

Typical tribasic and tetrabasic organic acids that can be used to prepare alkyd resins are as follows: citric acid, maleated fatty acids, trimellitic acid, trimellitic anhydride, pyromellitic acid and pyromellitic dianhydride.

Typical drying oils that can be used to prepare alkyd resins are as follows: castor oil, heat-bodied soya oil, coconut oil, corn oil, cottonseed oil, dehydrated castor oil, linseed oil, oiticica oil, safflower oil, soybean oil, and tung oil. Also usable are fatty acids derived from the above oils, tall oil, short chain aliphatic acids such as hexanoic acid, and aromatic acids such as benzoic acid.

The alkyd resins of this invention may be made from any of the usual combinations of such ingredients as are mentioned above except that an aromatic carboxylic acid carrying a sulfonate group on an aromatic nucleus, or equivalent, is substituted for part of the acid commonly used. It will be understood that, in this specification, the term "equivalent" is used to indicate reactants known in the art to yield the same alkyd product as the acid itself. "Equivalents" are illustrated in my above-mentioned U.S. Pat. No. 3,563,942, e.g., salts, esters, anhydrides, etc. The term "acid" used alone includes its equivalents.

The preferred type of aromatic carboxylic acid, with equivalents, i.e., sulfonated aromatic carboxylic compounds, is disclosed in my patent, and all those acids, and equivalents, are intended to be covered in this application. Of particular value is the dibasic acid (equivalent), the sodium salt of 5-sulfoisophthalic acid. This compound is both usable and commercially available. The other dibasic compounds of the patent are also usable as are monobasic sulfonates such as the sodium and potassium salts of o-, m-, and p-sulfobenzoic acids.

An amount of $-SO_3X$ (X representing sodium or potassium) of less than 5% by weight of the resin will provide water solubility, 0.1–10% by weight being preferred.

One well known method of preparing alkyds is the "fatty acid process." In this procedure, the polyol, dibasic acid and fatty acid in proper stoichiometric amounts are simultaneously esterified. It has been found that this procedure cannot be used with the sulfonated aromatic acids of this invention because it produces sluggish reactions, opaque solutions and eventually poor film properties. A slurry process has thus been developed in which the substituted sulfonated aromatic acids are first introduced into the alkyd backbone in the absence of fatty acid and then the fatty acid reacted with the backbone.

In a preferred procedure, polyhydric alcohol, e.g., glycerine or pentaaerythritol, and polyhydric acid, e.g., phthalic anhydride, isophthalic acid, or maleic anhydride, and the desired amount of substituted aromatic acid, e.g., the sodium salt of 5-sulfoisophthalic acid, are slurried together in an aromatic or ketonic azeotroping solvent, e.g., xylene, toluene, methyl ethyl ketone. Just sufficient solvent to fluidize the slurry need be used. These components are esterified at conventional esterification temperatures of 160°–210° C. The reaction is controlled by removing water of reaction via azeotropic distillation. When about half the theoretically calculated water has been distilled off, the slurry clarifies. Heating is stopped, fatty acid is added, and the alkyd is processed via conventional methods. Water is removed after the acid number reaches a desired low level, i.e., 5–15.

The alkyd resins of this invention may be used directly to form protective coatings on substrates, drying being accomplished by reaction in the air of the double bonds of the pendant unsaturated fatty acid groups, or by the addition of such conventional cross-linkers as methylated melamine formaldehydes. Generally, however, the resin will be used as a vehicle for pigments to form a paint or enamel in the usual manner.

Whether used alone or with pigments, the alkyd resin can tolerate substantial amounts of water without the need of ammonia or amine stabilizers. Furthermore, water-compatible solvents such as acetone, methyl ethyl ketone, alcohol, glycols, glycol ethers, glycol ether esters and the like can be used. At any given level of sulfonic acid salt, low molecular weight alkyds are more soluble in water or aqueous solvents than high molecular weight alkyds. As normally used in this invention, the alkyd resin and other additives will be in suspension in about 50 to 80% by weight of water. The total weight of solids will range from 20-50%.

The following examples illustrate the invention. In these examples, parts, percentages and ratios are by weight and temperature is in degrees centigrade unless otherwise noted.

EXAMPLE 1

Substituted Alkyd

| Ingredient | Parts |
|---|---|
| Trimethylolpropane | 285.4 |
| Maleic anhydride | 24.5 |
| Isophthalic acid | 156.0 |
| Sodium salt of 5-sulfoisophthalic acid | 64.3 |
| Benzoic acid | 18.3 |
| Xylene (azeotroping solvent) | 26.0 |

The above ingredients were refluxed at 170°14 210° C. while removing 32 parts of water (about one-half hour). At that point the solution cleared. After cooling, 294.0 parts of linseed oil fatty acids were added thereto. Heating was started again and continued at reflux (210°–240° C.) for a total of about 2 hours, an additional 42 parts water being removed during reflux. The acid number was 8.1. Heating was stopped and, during cooling, a 1:1 mixture of demineralized water and methyl ethyl ketone was added to reduce the solids content to 50%. This 38% linseed alkyd contained 3.8% —$SO_3Na$ with a viscosity of about 100 stokes. After six months' standing at room temperature, the alkyd solution exhibited no change in viscosity.

EXAMPLE 2

White Paint

A. A 20% solution of the alkyd resin of Example 1 was made up containing 600 parts of the alkyd in 150 parts of a 1:1 mixture of butyl ether of ethylene glycol and demineralized water. The pH was 4.3.

B. A white millbase was prepared by dispersing in a sand mill 400.0 parts of finely divided $TiO_2$ pigment with 300 parts of the solution from A above and an additional 100 parts of demineralized water. The pigment-to-binder ratio of this millbase was 50/15.

C. A paint was prepared by vigorously stirring 170.0 parts of the millbase of B and 186.27 parts of the solution of A with 1 part of methyl ethyl ketoxime, 4.2 parts of a 6% cobalt naphthenate solution and 150 parts of water. The pH of the paint was 6.3. The Zahn #2 viscosity was 65 sec.

D. Tests of the paint prepared above were made by coating glass panels by means of a doctor blade and permitting them to cure by standing in the air. The paint dried overnight at room temperature and had the normal resistance properties of an alkyd, e.g., gasoline resistance, water resistance, and pencil hardness of 2B. This paint remained stable after six months at room temperature.

EXAMPLE 3

Another paint was prepared by admixing:

| Ingredient | Parts |
|---|---|
| Resin of 2A | 93.1 |
| Millbase of 2B | 135 |
| Methyl ethyl ketoxime | 0.3 |
| 6% Cobalt naphthenate | 1.25 |
| Butyl ether of ethylene glycol | 15 |
| Deionized water | 45 |

A steel test panel treated with Bonderite ® 1000 was sprayed with this paint and the film was allowed to cure in air at room temperature for 24 hours. Results were as follows:

| | |
|---|---|
| Pencil hardness | 2B |
| 20-inch lb impact resistance | Pass* |
| Adhesion to metal | 100% |
| Conical mandrel flexibility | Pass* |
| Resistance to gasoline | Pass* |
| Resistance to water | Pass* |

*Passable (pass) means without cracking or swelling.

EXAMPLE 4

| Ingredient | Parts |
|---|---|
| Pentaerythritol | 144.8 |
| Phthalic ahydride | 143.6 |
| Benzoic acid | 35.4 |
| Sodium salt of m-sulfo-benzoic acid | 56.0 |
| Methyl isobutyl ketone (azeotroping solvent) | g.s. |

The above ingredients are refluxed at 180°–210° C. with removal of 20 parts of water (under 1 hour). The clear solution is cooled and 198.8 parts linseed oil fatty acids is added. Reflux is then maintained for 2½ hours (210°–240° C.) and another 20 parts water is removed. Heating is discontinued at an acid number of 9. On cooling, a 4/1/1 mixture of deionized water, methyl ethyl ketone and ethylene glycol monobutyl ether is added to reduce the solids content to 50%. This 38% linseed alkyd solution contains 5% —$SO_3Na$ and can be used in paints as noted above.

I claim:

1. A water-compatible, air-curable, film-forming alkyd resin carrying, on an aromatic nucleus, 0.1–10% by weight of —$SO_3$ X, X being sodium or potassium.

2. An alkyd resin of claim 1 wherein the aromatic nucleus is that of a monobasic or dibasic acid.

3. An alkyd resin of claim 2 wherein the aromatic nucleus is that of 5-sulfoisophthalic acid.

4. An alkyd resin of claim 2 wherein the aromatic nucleus is that of a sulfobenzoic acid.

5. A coating composition comprising an alkyd resin of claim 1.

6. A coating composition of claim 5 comprising additionally a pigment.

7. The process of preparing an alkyd resin wherein aromatic carboxylic acid or equivalent, part of which carries the —$SO_3$ X group, X being sodium or potassium, is reacted with polyhydric alcohol until about half the water produced is removed and the solution clarifies; and a drying oil or drying oil fatty acid is added and the reaction is completed.

8. The process of claim 7 wherein the water is removed with an azeotroping solvent.

9. The process of claim 7 wherein sulfonated isophthalic acid or equivalent carrying the —$SO_3$X group in the 5-position, X being sodium or potassium, is employed.

10. The process of claim 7 wherein phthalic anhydride and a salt of 5-isophthalic acid are reacted with trimethylolpropane with removal of water until the reaction mixture clarifies and the mixture is subsequently reacted with a drying oil or drying oil fatty acid.

11. The process of claim 7 wherein sulfobenzoic acid or equivalent is employed.

* * * * *